United States Patent Office 3,063,992
Patented Nov. 13, 1962

3,063,992
2β-HYDROXY STEROIDS AND MICROBIOLOGICAL METHOD OF PRODUCING SAME
Allen I. Laskin, Franklin Township, Josef Fried, Princeton, and Patrick A. Diassi, Westfield, N.J., assignors to Olin Mathieson Chemical Corporation, New York, N.Y., a corporation of Virginia
No Drawing. Filed Jan. 4, 1961, Ser. No. 80,540
11 Claims. (Cl. 260—239.55)

This invention relates to the synthesis of steroids. More particularly, the invention pertains to the production of steroids containing a hydroxyl group in the 2-postition. Still more particularly, the invention relates to a method for the 2β-hydroxylation of steroids by a microbiological process.

It has now been found that a hydroxyl group may be selectively introduced by microbiological means into the 2-position of steroids. By subjecting a steroid compound to the action of a fungus of the genus Gnomonia, it has been discovered that 2β-hydroxylation occurs in a very efficient manner. Not only is the conversion highly specific, but good yields of product are obtained.

Microorganisms which effect the introduction of a 2β-hydroxyl group are fungi of the genus Gnomonia, for example, G. fragariae, G. amoena, G. cingulata, G. dispora, G. errabunda, G. erythrostoma, G. fimicola, G. gnomon, G. leptostyla, G. rubi, G. setacea and G. ulmea. Gnomonia fragariae has been found to give the most satisfactory results and is the preferred organism.

Steroids which will undergo the transformation are generally compounds of the pregnane and Δ⁴-pregnene type, i.e. steroids which are saturated in the A-ring or which have a double bond in the 4(5)-position. 19-nor steroids and steroids having a 5-carbon A-ring, i.e. A-nor steroids, may also be subjected to the action of the microorganisms. In the case of the A-nor steroids, due to the difference in the number system, the hydroxyl group is numbered 1. It is understood, of course, that the starting material has no hydroxyl group in the 2-position and is saturated in the 1, 2-position.

Preferably, the method of this invention is applied to compounds having the basic structure

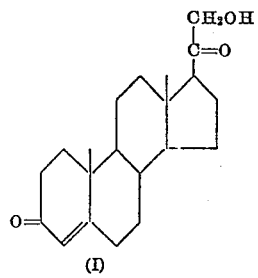

(I)

or

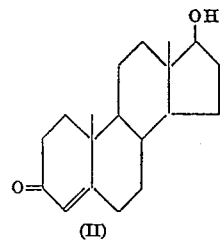

(II)

These basic structures may include additional substituents such as halogen, methyl, hydroxyl groups or the like in the 6,9,11,12 or 16-positions, 17-hydroxyl groups, 16,17-oxido groups, 16,17-alkylenedioxy groups, etc.

Examples of suitable substrates which will undergo 2β-hydroxylation according to this invention include, for example, cortexone, testosterone, 17α-methyltestosterone, A-nortestosterone, testololactone, 16α-hydroxyprogesterone, 16α,17α-oxido-cortexone, cotexolone, 6α-flurocortexolone, 6α-fluoro-16α-hydroxycortexolone, 16α,17α-acetonide, 16α-methylcortexolone, 9α-fluoro-11β-hydroxyprogesterone, etc.

The process of this invention for hydroxylating a steroid in the 2-position comprises subjecting a steroid of the type described above to the action of a microorganism of the genus Gnomonia under aerobic conditions in a nutrient medium and recovering the resulting 2β-hydroxylated steroid from the fermentation broth.

The hydroxylation can best be effected by including the steroid in an aerobic culture of the microorganism, or by bringing together, in an aqueous medium, a steroid, air and the microorganism. In general, the conditions for culturing the fungus of the genus Gnomonia are, except for the steroid substrate, the conventional conditions used for culturing other molds for the production of antibiotics and the like.

The method comprises growing the microorganism under aerobic conditions in contact with (in or on) a suitable fermentation medium. Such a medium comprises essentially a nitrogenous substance and a source of carbon and energy. The latter may be a carbohydrate such as sucrose, molasses, glucose, maltose, starch or dextrin, a fatty acid, a fat and/or the steroid itself. Preferably, however, the medium includes an assimilable source of carbon and energy in addition to the steroid.

The source of nitrogenous factors may be natural material, e.g. soybean meal, corn steep liquor, meat extract, distillers solubles and the like, or synthetic, i.e. composed of simple, synthesizable organic or inorganic compounds such as amine salts, alkali nitrates, amino acids, or urea. An adequate sterile air supply should be maintained during fermentation, for example, by the conventional methods of exposing a large surface of the medium to the air or by utilizing submerged aerated cultures, for example, by introducing an adequate supply of air through a sparger. The steroid may be added to the culture during the incubation period, or included in the medium prior to sterilzation or inoculation. The preferred (but not limiting) range of concentration of the steroid in the culture is about 0.01 to 0.10% by weight. The period during which the fermentation is carried out may vary considerably, e.g. from about 6 to about 96 hours. Upon completion of the incubation period, the product may be separated by removing the solids, e.g. by filtration, washing and extracting with solvents, e.g. chloroform, by conventional procedures. The hydroxylated steroid product may be recovered from the solvent extracts by recrystallization from an organic solvent such as acetone or by chromatographic methods, e.g. chromatography on neutral alumina.

The hydroxylated products of this invention are physiologically active steroids which possess hormonal activity, e.g. glucocorticoid, mineralocorticoid, progestational or androgenic activity. The compounds saturated in the A-ring may also be used as intermediates for the production of additional steroids e.g. 2-ketosteroids which in turn may be oxidatively converted into a 2,3-seco acids (protecting any other groups susceptible to oxidation) and then pyrolyzed to obtain A-nor steroids such as A-nortestosterone, A-norprogesterone, etc. The compounds which are unsaturated in the A-ring may first be reduced then similarly converted to A-nor steroids.

The following examples serve to illustrate the invention. All temperatures are expressed in degrees centigrade.

EXAMPLE 1

2β-Hydroxycortexone

Surface growth from each of three two-week old agar slant cultures of *Gnomonia fragariae* (ATCC 11430) maintained on the following nutrient medium (A):

| | Gms. |
|---|---|
| Glucose | 10 |
| Difco yeast extract | 2.5 |
| $K_2HPO_4$ | 1 |
| Agar | 20 |

Distilled water to one liter.

is suspended in 2.5 ml. of a 0.01% aqueous sodium lauryl sulfate solution. 1 ml. portions of this suspension are used to inoculate five 250 ml. conical flasks each containing 50 ml. of the following sterilized medium (B):

| | Gms. |
|---|---|
| Dextrose | 10 |
| Corn steep liquor | 6 |
| $NH_4H_2PO_4$ | 3 |
| Difco yeast extract | 2.5 |
| $CaCO_3$ | 2.5 |
| Soybean oil | 2.2 |

Distilled water to one liter.

The flasks are then incubated 96 hours at 25° on a rotary shaker (280 cycles/minute, 2 inch radius). At the end of this period, 10% transfers (vol./vol.) are made to 34 250 ml. conical flasks each containing 50 ml. of freshly sterilized medium B. After 24 hours of further incubation, 0.25 ml. of a sterile solution of 6% cortexone in N,N-dimethylformamide is added to each flask. After five days of further incubation, the contents of the flasks are pooled and filtered through a Seitz clarifying pad. The flasks, mycelium and pad are washed with 50 ml. portions of warm water. The filtrate and washings are combined and have a volume of 1700 ml.

The combined filtrate and washings are extracted with three 1 l. portions of chloroform and the combined chloroform extract evaporated to dryness in vacuo. The resulting residue (420 mg.) is triturated with ethyl acetate and the remaining crystalline residue recrystallized from 95% ethanol with the aid of decolorizing carbon (Darco G-60). The pure 2β-hydroxycortexone has the following properties: M.P. 196–198°; $[\alpha]_D^{24}$ —22.5° (chlf.);

$$\lambda_{max}^{alc.}\ 242\ m\mu\ (\epsilon = 13,500)$$

When allowed to stand with 2½% methanolic KOH for 4 hours, the ultraviolet spectrum changes as follows:

$\lambda_{max}^{alc.}$ 233 mμ ($\epsilon = 16,800$); sh., 250 mμ ($\epsilon = 6,000$); $\lambda_{max}^{Nuj}$ 2.81, 5.92 and 6.14μ.

*Analysis.*—Calc'd for $C_{21}H_{30}O_4$: C, 72.80; H, 8.73. Found: C, 72.99; H, 8.69.

2β-Hydroxycortexone 2,21-Diacetate

A solution of 37 mg. of 2β-hydroxycortexone in 1 ml. of dry pyridine and ½ ml. of acetic anhydride was allowed to remain at room temperature for 18 hours. The mixture was evaporated to dryness in vacuo and the resulting crystals (40 mg.) recrystallized from 95% ethanol. The diacetate crystallizes as a hemi-hydrate which does not lose water on drying at 100°. It has the following properties: M.P. 157–158°; $[\alpha]_D^{23}$ +17° (c., .60);

$\lambda_{max}^{alc.}$ 242 mμ ($\epsilon = 14,800$); $\lambda_{max}^{Nujol}$ 2.79, 5.78, 5.80, 5.96 and 6.18μ.

*Analysis.*—Calc'd for $C_{25}H_{34}O_6 \cdot \frac{1}{2}H_2O$ (439.52): C, 68.31; H, 8.02. Found: C, 68.43; H, 7.92.

2β-Hydroxycortexone 21-Acetate

To a solution of 1 g. of 2β-hydroxycortexone in 15 ml. of anhydrous pyridine was added 2.80 ml. of a solution containing 113.8 mg. of acetic anhydride per ml. of pyridine. After 4 hours at room temperature the reagents were removed in vacuo and the resulting crystalline residue recrystallized from acetone. There was obtained 265 mg. of the pure 21° mono-acetate of 2β-hydroxycortexone having the following properties: M.P. 175–177°, $\lambda_{max}^{Nujol}$ 2.90, 5.70, 5.81, 6.01 and 6.19μ; $[\alpha]_D^{23}$ —9.7° (c, 1.0 in chlf.).

*Analysis.*—Calc'd for $C_{23}H_{32}O_5$ (388.49): C, 71.10; H, 8.30. Found: C, 71.17; H, 8.37.

EXAMPLE 2

6α-Fluoro-Δ⁴-Pregnene-2β,16α,17α,21-Tetrol-3,20-Dione 16,17-Acetonide

Surface growth from each of five 3-week-old agar slant cultures of *Gnomonia fragariae* (ATCC 11430), the slant containing as a nutrient medium (A):

| | Gms. |
|---|---|
| Glucose | 10 |
| Difco yeast extract | 2.5 |
| $K_2HPO_4$ | 1 |
| Agar | 20 |

Distilled water to 1 liter.

is suspended in 2.5 ml. of a 0.01% sodium lauryl sulfate aqueous solution. One ml. portions of the suspension are used to inoculate ten 250 ml. conical flasks, each containing 50 ml. of the following sterilized nutrient medium (B):

| | Gms. |
|---|---|
| Dextrose | 10 |
| Cornsteep liquor | 6 |
| $NH_4H_2PO_4$ | 3 |
| Difco yeast extract | 2.5 |
| $CaCl_3$ | 2.5 |

Distilled water to 1 liter.

After five days of incubation at 25° C. with continuous rotary agitation (280 cycles per minute, 2 inch radius), 10% transfers (vol./vol.) are made to 67-250 ml. conical flasks each containing 50 ml. of fresh sterilized medium B. To each flask is added 0.25 ml. of a sterile solution of 6α-fluoro-Δ⁴-pregnene-16α,17α,21-triol-3,20-dione 16,17-acetonide in N,N-dimethylformamide (60 mg./ml.) so that the medium is supplemented with 300 mg./ml. of steroid. After 48 hours of further incubation, the contents of the flasks were pooled and filtered through a Seitz clarifying pad. The flasks, mycelium and pad are washed with successive 50 ml. portions of warm water. The combined filtrate and washings have a volume of 3380 ml. they are extracted with three portions of 1100 ml. of methylisobutyl ketone which are combined, washed twice with 1500 ml. portions of water and evaporated to dryness, in vacuo. The residue (1.0 g.) is crystallized from acetone-hexane to give 149 mg. of 6α-fluoro-Δ⁴-pregnene-2β,16α,17α,21-tetrol-3,20-dione 16,17-acetonide having M.P. 240–242°; $[\alpha]_D^{23}$ —53.1° (chlf.);

$\lambda_{max}^{alc.}$ 237 mμ ($\epsilon = 13,700$); $\lambda_{max}^{Nujol}$ 2.84, 5.86, 5.96 and 6.17μ

*Analysis.*—Calc'd for $C_{24}H_{33}O_6F$ (436.50): C, 66.04; H, 7.62; F, 4.35. Found: C, 65.65; H, 7.32; F, 4.72.

6α-Fluoro-Δ⁴-Pregnene-2β,16α,17α,21-Tetrol-3,20-Dione 2,21-Diacetate 16,17-Acetonide 6α-fluoro-Δ⁴-pregnene-2β,16α,17α,21-tetrol-3,20-dione 16,17-acetonide (50 mg.) is dissolved in 1 ml. of dry pyridine and 0.5 ml. of acetic anhydride and the resulting solution is stoppered and left at room temperature for 16 hours. It is then diluted with 10 ml. of water and extracted with 2×5 ml. of chloroform. The combined chloroform extracts are washed successively with 2 N HCl, 5% $NaHCO_3$ and water and then evaporated to dryness, in vacuo. Crystallization of the residue from acetone-hexane gives 43 mg. of 6α-fluoro-Δ⁴-pregnene-2β, 16α,17α,21-tetrol-3,20-dione 2,21-diacetate 16,17-acetonide having M.P. 198–200°; $[\alpha]_D^{23}$ −37.0° (chlf.); $\lambda_{max}^{alc}$ 236 mμ ($\epsilon$=15,100); $\lambda_{max}^{Nujol}$ 5.74, 5.82, 5.96, 618μ.

Analysis.—Calc'd for $C_{28}H_{37}O_8F$ (520.57): C, 64.79; H, 7.16. Found: C, 64.30; H, 7.42.

EXAMPLE 3
2β-Hydroxytestosterone

By following the procedure of Example 1 but substituting testosterone for the cortexone, 2β-hydroxytestosterone is obtained.

EXAMPLE 4
2β-Hydroxy-17α-Methyltestosterone

By following the procedure described in Example 1, substituting 17α-methyltestosterone for the cortexone, 2β-hydroxy-17α-methyltestosterone is obtained.

EXAMPLE 5
1β-Hydroxy-A-Nortestosterone

By substituting A-nortestosterone for the cortexone and proceeding as described in Example 1, 1β-hydroxy-A-nortestosterone is obtained.

EXAMPLE 6
2β-Hydroxytestololactone

By substituting testololactone for the cortexone and proceeding as described in Example 1, 2β-hydroxytestololactone is obtained.

EXAMPLE 7
2β,16α-Dihydroxyprogesterone

By substituting 16α-hydroxyprogesterone for the cortexone and proceeding as described in Example 1, 2β,16α-dihydroxyprogesterone is obtained.

EXAMPLE 8
2β-Hydroxy-16α,17α-Oxidocortexone

By substituting 16α,17α-oxidocortexone for the cortexone and proceeding as described in Example 1, 2β-hydroxy-16α,17α-oxidocortexone is obtained.

EXAMPLE 9
2β-Hydroxycortexolone

By substituting cortexolone for the cortexone and proceeding as described in Example 1, 2β-hydroxycortexolone is obtained.

EXAMPLE 10
2β-Hydroxy-6α-Fluorocortexolone

By substituting 6α-fluorocortexolone for the cortexone and proceeding as described in Example 1, 2β-hydroxy-6α-fluorocortexolone is obtained.

EXAMPLE 11
2β-Hydroxy-16α-Methylcortexolone

By substituting 16α-methylcortexolone for the cortexone and proceeding as described in Example 1, 2β-hydroxy-16α-methylcortexolone is obtained, M.P. 196–198°; $[\alpha]_D^{23}$ −60.8° (chlf.);

$\lambda_{max}^{alc}$ 242 mμ ($\epsilon$=14,300)

Analysis.—Calc'd for $C_{22}H_{32}O_5$: C, 70.18; H, 8.57. Found: C, 70.70; H, 8.73.

EXAMPLE 12
2β-Hydroxyprogesterone

By substituting progesterone for the acetonide as the substrate and cultures of G. cingulata, G. errabunda, G. erythrostoma and G. fimicola, respectively, for the G. fragariae, and otherwise proceeding as described in Example 2, 2β-hydroxy-progesterone is obtained in each instance.

EXAMPLE 13
2β-Hydroxy-16α-Methylcortexolone

By substituting 16α-methylcortexolone for the acetonide as the substrate and cultures of G. cingulata, G. errabunda, G. erythrostoma and G. fimicola, respectively, for the G. fragariae and otherwise proceeding as described in Example 2, 2β-hydroxy-16α-methylcortexolone is obtained in each instance.

EXAMPLE 14
9α-Fluoro-2β,11β-Dihydroxyprogesterone

By substituting 9α-fluoro-11β-hydroxyprogesterone for the cortexone and proceeding as described in Example 1, 9α-fluoro-2β,11β-dihydroxyprogesterone is obtained.

What is claimed is:
1. A process for hydroxylating a steroid in position 2 which comprises culturing a microorganism of the genus Gnomonia under aerobic conditions in a nturient medium containing a steroid unhydroxylated in the 2-position, an assimilable source of nitrogen, carbon and energy.

2. A process as in claim 1 wherein the microorganism is Gnomonia fragariae.

3. A process for hydroxylating a steroid in position 2 which comprises culturing a microorganism of the genus Gnomonia under aerobic conditions in a nutrient medium containing a steroid unhydroxylated in the 2-position, an assimilable source of nitrogen, carbon and energy and recovering the 2β-hydroxylated steroid from the fermentation broth.

4. A process for the introduction of a 2β-hydroxy group into a $\Delta^{4(5)}$-unsaturated steroid of the pregnene series which comprises culturing Gnomonia fragariae under aerobic conditions in a nutrient medium containing a $\Delta^{4(5)}$-unsaturated steroid of the pregnene series unhydroxylated in the 2-position, an assimilable source of nitrogen, carbon and energy and recovering the product from the fermentation broth.

5. A process which comprises culturing Gnomonia fragariae under aerobic conditions in a nutrient medium containing cortexone, an assimilable source of nitrogen, carbon and energy and recovering 2β-hydroxycortexone from the fermentation broth.

6. A process which comprises culturing Gnomonia fragariae under aerobic conditions in a nutrient medium containing 6α-fluoro-16α-hydroxycortexolone 16α,17α-acetonide, an assimilable source of nitrogen, carbon and energy and recovering 6α-fluoro-2β,16α-dihydroxycortexolone-16α,17α-acetonide from the fermentation broth.

7. 6α-fluoro-$\Delta^4$-pregnene-2β,16α,17α,21-tetrol-3,20-dione 16,17-acetonide.

8. 6α-fluoro-$\Delta^4$-pregnene-2β,16α,17α,21-tetrol-3,20-dione 2,21-diacetone 16,17-acetonide.

9. 1β-hydroxy-A-nortestosterone.

10. 2β,16α-dihydroxyprogesterone.

11. A process for the introduction of a 2β-hydroxy group into a steroid having the basic structure selected from the group consisting of

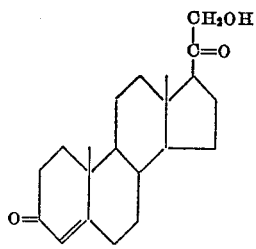

and
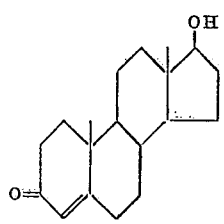
which comprises culturing said steroid with a microorganism of the genus Gnomonia under aerobic conditions a medium containing an assimilable source of nitrogen carbon and energy.
References Cited in the file of this patent
UNITED STATES PATENTS
2,968,595   Greenspan et al. _____ Jan. 17, 196

UNITED STATES PATENT OFFICE
CERTIFICATE OF CORRECTION

Patent No. 3,063,992                      November 13, 1962

Allen I. Laskin et al.

It is hereby certified that error appears in the above numbered patent requiring correction and that the said Letters Patent should read as corrected below.

Column 6, line 25, for "nturient" read -- nutrient --; line 57, strike out "dione"; line 59, for "diacetone" read -- diacetate --.

Signed and sealed this 30th day of April 1963.

(SEAL)
Attest:

ERNEST W. SWIDER                      DAVID L. LADD
Attesting Officer                      Commissioner of Patents